(12) United States Patent
Nishibori et al.

(10) Patent No.: US 6,347,790 B1
(45) Date of Patent: Feb. 19, 2002

(54) SHOCK ABSORBER AND METHOD FOR PRODUCING THE SAME, AND FILLER FOR THE SAME

(75) Inventors: Sadao Nishibori, Tokyo; Hideji Hoshimura, Aichi, both of (JP)

(73) Assignee: Ein Kohsan Co., Ltd., Tokyo (JP)

( * ) Notice: Subject to any disclaimer, the term of this patent is extended or adjusted under 35 U.S.C. 154(b) by 0 days.

(21) Appl. No.: 09/366,925

(22) Filed: Aug. 4, 1999

(30) Foreign Application Priority Data

Aug. 7, 1998 (JP) .......................... 10-224800
Jul. 15, 1999 (JP) .......................... 11-201847

(51) Int. Cl.$^7$ .................................. F16F 1/36
(52) U.S. Cl. .................... 267/148; 428/362; 267/146
(58) Field of Search .................. 188/376, 377; 267/140, 201, 139, 142–146, 148; 428/362, 338, 220, 373, 198, 361

(56) References Cited

U.S. PATENT DOCUMENTS

| | | | |
|---|---|---|---|
| 3,666,055 A | | 5/1972 | Walker et al. |
| 3,852,152 A | * | 12/1974 | Werner et al. .............. 428/338 |
| 4,062,521 A | | 12/1977 | Moreau |
| 4,086,015 A | | 4/1978 | Eliasson |
| 4,172,174 A | * | 10/1979 | Takagi ........................ 428/362 |
| 5,183,708 A | * | 2/1993 | Yoshida et al. ............. 428/373 |
| 5,298,321 A | * | 3/1994 | Isoda et al. ............. 428/362 X |
| 5,639,543 A | * | 6/1997 | Isoda et al. ................. 428/220 |
| 5,830,566 A | * | 11/1998 | Kimura et al. .............. 428/361 |
| 5,863,483 A | | 1/1999 | Tom et al. |

FOREIGN PATENT DOCUMENTS

| | | | |
|---|---|---|---|
| JP | 60016878 | | 1/1985 |
| JP | 61086471 | | 5/1986 |
| JP | 07173752 | | 7/1995 |
| JP | 861414 | * | 3/1996 |
| JP | 11315461 | * | 11/1999 |
| WO | 9514822 | | 6/1995 |

* cited by examiner

Primary Examiner—Robert J. Oberleitner
Assistant Examiner—Melanie Torres
(74) Attorney, Agent, or Firm—Pillsbury Winthrop LLP (57) ABSTRACT

An object of the invention is to provide a shock absorber which can reduce damage to the member to collide therewith. The invention provides a shock absorber comprising a cushion structure of three-dimensional spring construction, which has a large void provided by a random curl or loop formed by hot extruding a thermoplastic resin to form a continuous strip and curling or looping the strip in a molten state to bring adjoining strip sections into interlocking contact with each other. In the invention, the cushion structure may be obtained by stacking a plurality of cushion structure members, each having high cushion performance and buckling resistance and a certain thickness, one upon another parallel in a thickness direction or rolling up one side of a cushion member with a given thickness. Then, the cushion structure is embedded in a foamed and hardened filler containing a hydratable, hydraulic binder while a part of the cushion structure is exposed on an shock-receiving surface.

9 Claims, 5 Drawing Sheets

TIME vs. ACCELERATION GRAPH

FIG. 3A

DISPLACEMENT vs. LOAD GRAPH

SHOCK ABSORBER AND METHOD FOR PRODUCING THE SAME, AND FILLER FOR THE SAME

BACKGROUND OF THE INVENTION

1. Field of the Invention

The present invention relates to a shock absorber and a method for producing the same, and more specifically to a shock absorber comprising a cushion structure of three-dimensional spring construction having a large void comprising a random loop formed by hot extruding a polyester elastomer, a nylon elastomer, an urethane elastomer or an olefin elastomer comprising a high-molecular material having both properties of thermoplastic resin or rubber and engineering plastics, for instance, a polyester thermoplastic elastomer to form a continuous strip, and curling or looping said strip while it is in a molten state to bring, for instance, adjoining strip sections in interlocking contact with each other. The cushion structure, which can reduce plastic deformation of strip bends portion caused by compression deformation, and which has a restoring property that enables the cushion structure to be restored by a recovery force of strip rubber elasticity immediately upon a release of stress, is embedded in a foamed and hardened filler. The present invention also relates to a shock absorber production method as well as a filler suitable for use with the shock absorber.

2. Description of the Related Art

A shock absorber material has been provided in the form of a so-called cushion drum as an example. This cushion drum is used for the purpose of absorbing shocks generated upon collision of vehicles with barriers or other facilities positioned at turning points on highways, thereby reducing damages to both the human body and the facilities, and is built up of a drum member with a 100 to 400-liter water bag contained therein.

Another version of the shock absorber positioned on highways, etc. is a bellows type fender made up of steel.

The U.S. Department of Transportation "Safety Standard for Securing Drivers" prescribing the safety standard for drivers states that when gravitational acceleration (gravity on the floor of a vehicle in the back-and-forth direction) applied to a vehicle upon collision is less than 20 G, damage to passengers can be reduced to a vitally safe level (at which hospital care is required, leaving serious traumas. At 15 G or less, the damage can be reduced to a level free of any trauma (at which hospital care is required). At 12 G or less, the damage can be reduced to a level at which clinical care is needed but hospital care is not always needed.

Even with the aforesaid cushion drum, for instance, a 900×900×900 mm drum having a weight of 18 kg and a 400 liter water bag, a 1.5 ton automobile traveling at 65 km/h can be reduced to 45.7 km/h upon collision.

Upon receipt of impact energy, however, the aforesaid cushion drum is deformed, broken off, and completely scattered away. When a traveling car, etc. collides with this shock absorber, it is thus impossible to absorb the resulting shocks completely. Consequently, the car unavoidably collides with a barrier located behind the shock absorber.

The aforesaid cushion drum is made up of a drum member with a water bag contained therein, as already mentioned. Thus, this cushion drum itself is formed into a desired shape to construct, for instance, a base of signposting, a wall to be positioned at a curve, or a separator or the like to be positioned at a turning point.

Instead of water, other substance may be filled in a cushion drum such as the aforesaid one. However, such a shock absorber is usually positioned outdoors, for instance, on roads, and so is required to have a weight heavy-enough to be unsusceptible to displacement due to winds, vibrations, and mischief, ultraviolet shielding capabilities that can prevent degradation due to exposure to ultraviolet radiation, and given endurance that can dispense with maintenance. In addition, the shock absorber is required to have given strength that allows the shock absorber per se to absorb shocks.

When the aforesaid cushion drum member is filled with known concrete or the like, conditions regarding weight, flame retardance, endurance, etc. may be satisfied. However, gravitational acceleration upon collision cannot be brought down to the aforesaid vitally safe level of 20 G or lower because the filled concrete has an increased strength.

On the other hand, the aforesaid bellows type of shock absorbing fender made up of steel is designed to absorb shocks applied to a vehicle upon collision. Given the fact that an accident-prone vehicle having a engine displacement of 2,000 cc or greater has a weight of about 1.8 tons, however, this fender cannot stand up to collision of the vehicle therewith. In addition, the bellows form of shock absorbing fender takes much cost, time, and trouble to install.

In view of the aforesaid problems associated with the prior art, it is an object of the invention to provide a shock absorber which has high shock absorption capabilities. Especially when a vehicle collides with the shock absorber, gravitational acceleration (gravity applied on the floor of the vehicle in the back-and-forth direction) applied on the vehicle can be brought down to 20 G or less, preferably 15 G or less, and more preferably 12 G or less. In addition, the shock absorber of the invention is well capable of absorbing shocks, because it comprises as a part of shock absorber a filler that can absorb shocks upon collision of a vehicle or the like therewith, and makes it easy to achieve any desired impact resistance depending on the object to be protected. Further, the shock absorber can be easily produced with shape depending on purpose. Another object of the invention is to provide a method for producing such a shock absorber. Yet another object of the invention is to provide a filler suitable for use with the shock absorber of the invention.

A further object of the invention is to provide a shock absorber filler which has a breaking strength enough to enable a shock absorber to be broken upon receipt of a certain or larger shock, thereby absorbing the shock while it satisfies conditions regarding the necessary weight, flame retardance, weather resistance, endurance, etc.

SUMMARY OF THE INVENTION

To achieve the aforesaid objects, the present invention provides a shock absorber comprising a cushion structure of three-dimensional spring construction, which has a large void provided by a random curl or loop formed by hot extruding, a thermoplastic resin to form a continuous strip and curling or looping said strip in a molten state to bring adjoining strip sections into interlocking contact with each other. Hereinafter, this cushion structure will simply be referred to as the "cushion structure". In the invention, the cushion structure may be obtained by putting a plurality of cushion structure members, each having high cushion performance and buckling resistance and a certain thickness, one upon another parallel in a thickness direction or rolling up one side of a cushion member with a given thickness. Then, the cushion structure is embedded in a foamed and hardened filler containing a hydratable, hydraulic binder while a part of the cushion structure is exposed on an shock-receiving surface.

Preferably, the cushion structure should have a bulk specific gravity of 0.003 to 0.3 g/cm$^3$. At less than the lower limit value, the effect on shock absorption becomes slender, and at greater than the upper limit value, the amount of the binder mixed with water and a foaming agent to penetrate through the cushion structure becomes small, resulting in poor impact resistance.

Preferably, the cushion structure should have a strip diameter of 0.1 mm to 3 mm although depending on the type and bulk density of the thermoplastic resin. In view of shock absorption capabilities, the thus constructed cushion structure should also have a specific gravity of 0.2 to 1.3. The cushion structure may be constructed by stacking a plurality of cushion structure members varying in bulk specific gravity or strip diameter one upon another in the thickness direction.

The present invention also provide a shock absorber production method, characterized by placing a cushion structure of three-dimensional spring construction in a mold, and pouring and aging a foaming filler containing a hydratable, hydraulic binder in said mold, said cushion structure having a large void provided by a random curl or loop formed by hot extruding a thermoplastic resin to form a continuous strip and curling or looping said strip in a molten state to bring adjacent strip sections into interlocking contact with each other. Preferably, the mold should be a plastic film or sheet container which per se forms an outer face or wall of a shock absorber. In the invention, however, it is acceptable to use other plastic molding containers.

Regarding the strength of the shock absorber according to the invention, it may be possible to make the rigidity of the shock absorber lower than that of the member to collide therewith, e.g., a vehicle, thereby absorbing all collision energy into the shock absorber. In this case, however, it is required to make the shock absorber longer and heavier than contemplated in the invention. Alternatively, it may be possible to make the rigidity of the shock absorber higher than that of the member to collide therewith, e.g., a vehicle, thereby absorbing shocks upon receipt of a shock exceeding the rigidity of the vehicle. In this case, however, gravitational acceleration (gravity applied on the floor of the vehicle in the back-and-forth direction) applied on the vehicle upon collision with the shock absorber is of the order of 30 G, and so damage to passengers cannot be reduced to the vitally safe level. It is thus preferable that the shock absorber of the invention has a strength on the same level as the rigidity of the vehicle, so that the shock absorber can absorb impact energy in an integral fashion with the vehicle.

To allow the shock absorber to have such strength, the filler for the shock absorber according to the invention should be formed by kneading together 4.0 to 33.3 wt % of a hydratable, hydraulic binder, 2.7 to 46.7 wt % of calcium carbonate (stone dust), 2.7 to 53.3 wt % of an aggregate (sand), 13.3 to 53.3 wt % of water, and 1.4 to 10.0 wt % of a foaming agent (including diluting water).

The filler should have a breaking load of 10 kgf/cm$^2$ or less, preferably 4 kgf/cm$^2$ or less, and more preferably 2 kgf/cm$^2$ or less, as found after dried and hardened.

The hydratable, hydraulic binder contained in the filler may comprise lime aluminate and lime silicate in chemical combining components. More specifically, the binder of the invention may comprises 15 to 18% of $3CaOAl_2O_3$ as the lime aluminate and 55 to 60% of $3CaOSiO_2$ and 10 to 20% of $2CaOSiO_2$ as the lime silicate.

BRIEF DESCRIPTION OF THE DRAWING

The object and advantages of the invention will become understood from the following detailed description of preferred embodiments thereof in connection with the accompanying drawings in which like nnames designate like elements, and in which.

DETAILED DESCRIPTION OF THE PREFERRED EMBODIMENTS

The shock absorber of the invention comprises a cushion structure of three-dimensional construction having a large void formed by a curl or loop, and a filler in which at least a part of the cushion structure is embedded.

Cushion Structure

Preferably but not exclusively, the thermoplastic resin used herein should include polyethylene, polyester, nylon and acrylic resin as well as polyvinyl chloride, polypropylene and polyester elastomer. In the present invention, it is particularly preferable that the shock absorber is constructed using a cushion structure formed by compression molding of polyester monofilaments obtained by regeneration of PET bottles.

The three-dimensional cushion structure comprising a random loop is provided by hot extruding the aforesaid resin to form a continuous strip, and then looping the continuous strip of ca. 0.1 to 3 mm in diameter while it is in a molten state, thereby bringing adjoining strip sections into, at least partial, interlocking contact with each other. This cushion structure may have been formed by compression molding into a predetermined shape. Alternatively, a polyester monofilament flocculate may be formed into a given shape once separated into individual monofilaments, thereby obtaining a cushion structure.

In the invention, a polyester type of thermoplastic elastomer is used as the thermoplastic elastomer. This thermoplastic elastomer is then hot extruded into a continuous strip which has a diameter of about 3 mm in a molten state. Then, the strip is looped to bring adjoining strip sections into interlocking contact with each other, thereby obtaining a cushion structure of three-dimensional spring construction comprising a random loop and having a bulk density of 0.08 g/cm$^3$ with W:D:H=30×30×10 mm.

As typically disclosed in U.S. Pat. No. 2,548,477, this cushion structure may comprise as a matrix a non-elastic polyester type of crimped short fiber cushion structure having a density of 0.005 to 0.310 g/cm$^3$ and a thickness of 5 mm or longer. In the short fiber cushion structure, there are dispersed and incorporated elastic composite fibers which comprise a thermoplastic elastomer having a melting point that is at least 40° C. lower than that of a short fiber-constituting polyester polymer and a non-elastic polyester, with the former being exposed on at least the surfaces thereof. Then, (A) an amoebic form of omnidirectional, flexible points formed by heat fusion of the elastic composite fibers crossing over themselves and (B) quasi-omnidirectional, flexible points formed by heat fusion of the elastic composite fibers crossing over the non-elastic polyester type short fibers are scattered throughout the cushion structure. In composite fiber groups between adjoining flexible points (A) and (A), (A) and (B), and (B) and (B), some composite fibers are provided with at least one spindle-shaped node along their longitudinal direction. This cushion structure is cut into a desired sectional shape of, e.g., W:D:H=30×30×10 mm, as already mentioned. Three such cushion structures stacked one upon another, with W:D:H= 30×30×30 mm, are positioned in a mold having a volume of W:D:H=35×35×35 mm, or a plastic film or sheet container or a metal container serving as said mold while they are spaced 5 mm away from the inner wall thereof.

Filler

Then, a foaming filler including a hydratable, hydraulic binder is poured into the mold. By the "hydratable, hydraulic binder" used herein is intended a binder which, like lime aluminates or lime silicates, has a property (ability to hydrate) of combining chemically with a part of water upon kneaded with the water and a property (hydraulicity) of hardening by combination with water. In an embodiment of the invention, a binder containing lime silicate and lime aluminate in chemical combining components is used. For instance, a binder is used, comprising 15 to 18% $3CaOAl_2O_3$ as the lime aluminate and 55 to 60% of $3CaO\text{-}SiO_2$ and 10 to 20% of $2CaOSiO_2$ as the lime silicate.

Of the chemical combining components, the lime aluminate ($3CaOAl_2O_3$) exhibits its hydrating action at the earliest stage, producing strength over a period of about one week. Then $3CaOSiO_2$ begins to exhibit its hydrating action, and maintains strength over a period of 4 to 13 weeks after the lapse of one week. Finally, $2CaOSiO_2$ exhibits its hydrating action at the latest stage, becoming a leading cause for the maintenance of strength after the lapse of one month. To achieve a shock absorber capable of expediting the hardening of the filler thereby increasing productivity and preventing a long-term strength increase thereby preventing any degradation of the shock absorber, therefore, it is desired to reduce the combining amount of $2CaOSiO_2$ to a relatively low level.

In one embodiment of the invention, the binder may be formed by mixing a calcareous raw material and a clayey raw material at a given ratio, firing the mixture into a lump, and crushing the lump. In another embodiment of the invention, $11CaO7Al_2O_3CaF_2$ may be used as a quick-hardening component, i.e., calcium aluminate. Then, this component is allowed to exist in the fired lump with allit (tricalcium aluminate: $3CaOAl_2O_2$), and is mixed with II type anhydrous gypsum and small amounts of additives, thereby achieving a quick-hardening property.

If the filler is foamed by kneading the binder with water and a foaming agent. it is then possible to impart the desired brittleness thereto. In a preferable embodiment, an aggregate (sand) and calcium carbonate (stone dust) are incorporated in the filler in an amount larger than is the binder to make the bonding force so weak that the filler can break easily upon receipt of impacts.

The foaming agent to be mixed with the binder may be obtained by mixing, optionally under agitation, 0.1 to 0.4 wt % of a chemical agent composed mainly of a sulfate type anionic surface active agent with [13.3–(0.1~1.4)] to [53.3–(0.1~0.4)] wt % of water, pressurizing the mixture with a plunger, and preferably feeding under pressure the mixitre into a nozzle with compressed air, thereby forming foams having a particle size of 9 $\mu$m to 10 mm for instance.

The water to be mixed with the chemical agent, even when used in an amount of [13.3–(0.1~0.4)] wt % or smaller, ensures so a high rate of foaming that product breaking strength can be achieved, and good-enough shock absorption as well The water, even when used in an amount of [53.3–(0.1~0.4)] wt % or larger, can accommodate well to product strength.

It is here to be noted that for the aforesaid foaming agent, not only the aforesaid surfactant but also animal protein may used alone or with a surface active agent added thereto.

The raw materials for the filler as mentioned above are kneaded and mixed together in a mixer known in the art, and the resultant mixture is then poured in the aforesaid mold. When the filler is obtained by kneading the binder with water and the foaming agent, the binder is first charged and stirred with water in the mixer. Then, the foaming agent is jetted to 40 to 90 wt % of the resultant mixture for kneading. Finally, the mixture is poured into the mold. When sand and calcium carbonate (stone dust) are used, the foaming agent is first jetted to 80 to 98 wt % of a mixture obtained by kneading together the binder, water, sand and calcium carbonate. Then, the mixture is poured in the mold.

While the filler is poured in the mold, vibrations are applied to the mold so that the filler can be filled in empty spaces in the cushion structure at a uniform density. Following this, the filler is aged for about 28 days for drying and hardening.

In the instant embodiment, the filler is designed by control of the composition of the chemical combining components in the filler such that it can be dried and hardened within a short period of about 1 to days. However, $2CaOSiO_2$, etc. in such components take a relatively long time to produce strength, and so the filler should be dried and hardened for 28 days so as to prepare a shock absorber test piece.

It is here to be noted that the shock absorber of the invention, even when the filler is formed by adding the foaming agent to the binder kneaded together with water, can have appropriate shock absorption capabilities. To obtain a filler which can be broken and scattered in a particulate form to absorb shocks in a suitable manner, however, it is more preferable to add large amounts of sand and calcium carbonate (stone dust) as aggregates in addition to the water, binder and foaming agent.

For instance, the filler may be composed of 4.0 to 33.3 wt % of binder, 2.7 to 46.7 wt % of calcium carbonate (stone dust), 2.7 to 53.3 wt % of aggregate, 13.3 to 53.3 wt % of water, 0.1 to 0.4 wt % of foaming agent, and 1.3 to 9.6 wt % of foaming agent-diluting water.

The calcium carbonate (stone dust) used in the instant embodiment is a white powder composed of 53.94% of CaO, 1.88% of $SiO_2$, 0.51% of MgO, and 0.09% of $Al_2O_3$ plus $Fe_2O_3$, with an 1 g. loss of 42.85%, a specific surface area of 5,000 $cm^2$/g, a specific gravity (density) of 2.70, a particle size distribution of 300 $\mu$m to 3 $\mu$m, and an average particle diameter of 9.8 $\mu$m. By incorporating this calcium carbonate into the filler, a part of the powder amount of the hydratable, hydraulic binder can be replaced by the calcium carbonate.

It is here to be noted that the calcium carbonate makes no contribution to any improvement in the strength of the filler. By replacing a part of the binder by calcium carbonate, it is thus possible to make the filler of the invention brittle as desired. In addition, the calcium carbonate, because of having a large specific surface area, can improve the resistance of the formed filler to separating into individual materials, and so can make some contribution to improvements in the shape retention of the brittle filler according to the invention.

EXAMPLE

TABLE 1

Components of Filler

| | Blending Ratio C:S | W/C (%) | Amount of Air (%) | Specific Gravity | Binder (kg) | Water (kg) | Foaming Agent (kg) |
|---|---|---|---|---|---|---|---|
| Y | 1:0 | 73 | 70:±5 | 0.2 | 150 | 110 | 2.5 |
| Z | 1:0 | 70 | 68:±5 | 0.35 | 120 | 175 | 2.2 |
| A | 1:0 | 68 | 65:±5 | 0.5 | 350 | 238 | 2.0 |
| B | 1:0 | 57 | 60:±5 | 0.65 | 450 | 257 | 1.7 |
| C | 1:0 | 56 | 52:±5 | 0.81 | 550 | 308 | 1.4 |
| D | 1:0 | 55 | 48:±5 | 0.91 | 650 | 355 | 1.2 |
| F | 1:0 | 35 | 44:±5 | 1.05 | 750 | 398 | 1.0 |

Note:
Foaming Agent: AP Foam (Kizai Techto Co., Ltd.)
C:S Binder:Aggregate (no aggregate added in each example)
W/C: Water/Binder
Specific gravity is a specific gravity of shock absorber available as commercial product.

TABLE 2

Example 1

| | |
|---|---|
| Cushion Structure | Bless Air (Toyobo Co., Ltd.) |
| Strip Diameter | φ 3 mm |
| Weight | 1.14 kg |
| Volume | Three cushions of 300 mm × 300 mm × 80 mm stacked one upon another |
| Molding | Bottom thickness of 40 mm, molded of foamed concrete alone |
| Foaming Filler | Prepared with compositions Y, Z, A, B, C, and D |

TABLE 3

Example 2

| | |
|---|---|
| Cushion Structure | Normad, Mat Extra duty, Sumitomo 3M Co., Ltd. |
| Volume | Seventeen vinyl chloride mats of 300 mm × 300 mm × 14 mm (thickness) stacked one upon another |

TABLE 4

Example 3

| | |
|---|---|
| Cushion Structure | Vinyl Chloride: Normad, Mat Standard Unback (Sumitomo 3M Co., Ltd.) |
| Volume | Thirty vinyl chloride mats of 300 mm × 300 mm × 8 mm (thickness), stacked one upon another |

Comparative Example 1

Fillers A, B, and C were cast into a frame of 300 mm×30 mm×280 mm without any cushion structure.

Comparative Example 2

Using polyester elastomer P-280B made by Toyobo Co., Ltd., a hollow thread of φ1 mm was extruded. Twenty-nine (29) such threads were knitted together at right angles to a (non-stretched) 30 cm×30 cm fabric. Ninety-four (94) such fabrics, stacked one upon another, were placed in a frame. Each cushion structure had the same weight as Bless Air in Example 1.
Weight Proportion
Eleven point four six (11.46) kg of filler was used with 1.14 kg of P-280B.

Comparative Example 3

The thread in Comparative Example 2 was pulverized to a length of 5 mm or less and an average length of 3 mm, and mixed with the filler during its mixing.
Eleven point five six (11.56) kg of filler was used with 1.14 kg of thread.

Test Example 1

The shock absorbers according to the example and comparative examples were tested as follows.
Drop-Weight Test on Shock Absorber
1. Test Method
A shell form of weight of 400 mm in the diameter of the base, 370 mm in length and 300 kg in weight was naturally dropped from a height of 4 m on each shock absorber.
After the drop-weight tests were conducted using the test pieces of Example 1 to Comparative Example 3, whether or not the bottom of each test piece was broken (bottoming) was confirmed. Vibrations were imparted to the inverted test piece to collect broken filler pieces, from which powders of f5 or less (4-mesh pass) were recollected to find the weight % of the crushed filler.

TABLE 5

Filler Y

| | Bottoming | State of Bottom (portion with no cushion structure) |
|---|---|---|
| Ex. 1 | not found | 3 cracks |

(Note: Ex:Example)

TABLE 6

Filler Z

| | Bottoming | State of Bottom |
|---|---|---|
| Ex. 2 | not found | one crack |

TABLE 7

Filler A

| | Bottoming | State of Bottom |
|---|---|---|
| Ex. 1 | not found | no change |
| Ex. 2 | not found | no change |
| Ex. 3 | not found | no change |
| Comp. Ex. 1 | found | broken |
| Comp. Ex. 2 | not found | many cracks |
| Comp. Ex. 3 | found | broken |

(Comp. Ex.: Comparative Example)

TABLE 8

Filler B

| | Bottoming | State of Bottom |
|---|---|---|
| Ex. 1 | not found | no change |
| Ex. 2 | not found | no change |
| Ex. 3 | not found | no change |
| Comp. Ex. 1 | found | broken |
| Comp. Ex. 2 | not found | 8 cracks |
| Comp. Ex. 3 | found | broken |

TABLE 9

Filler C

| | Bottoming | State of Bottom |
|---|---|---|
| Ex. 1 | not found | no change |
| Ex. 2 | not found | no change |
| Ex. 3 | not found | no change |
| Comp. Ex. 1 | found | broken |
| Comp. Ex. 2 | not found | 5 cracks |
| Comp. Ex. 3 | found | broken |

TABLE 10

Fillers D, E

| | Bottoming | State of Bottom |
|---|---|---|
| Ex. 1 | not found | no change |

With filler Y, there was no bottoming, but some test pieces cracked on their bottoms. Hence, filler Y is believed to be a limit to the invention. The cushion structure-free test piece composed only of short fibers was poor in shock resistance. In Comparative Example 2, too, bottoming was observed. It is thus found that the cubic form of cushion structure is more advantageous than other cushion structures.

TABLE 11

Specific Gravity in Example 1

| Y | 0.2 |
|---|---|
| Z | 0.35 |
| A | 0.5 |
| B | 0.65 |
| C | 0.81 |
| D | 0.91 |
| E | 1.05 |

Example 1 shows that while the weight comes down to the bottom, the filler is less susceptible to powdering. The cushion structure disperses impact force, and the whole is broken to absorb energy. In Comparative Example 2, impact force cannot perfectly be dispersed because of the absence of a cushion structure and because the filler is not wrapped up.

Further, the following experiments were conducted.

How energy was transmitted when impact was given to one point on resins differing in terms of object, kind, and thickness was observed.

Testing Procedure: Twenty-nine (29) wefts and 29 warps were knitted together into a 30 cm×30 cm size, in which a 5 mm thick filler A was cast to form a core, thereby preparing a test piece.

An iron ball of $\phi 16.5$ mm and 18.4 g was dropped on the test piece.

Evaluation
1. Whether or not the iron ball went through the test piece was observed.
2. The area of the filler upon broken was found (in diameter).

Experiment 1
Using the following resins, threads of $\phi 0.5$ mm were extruded.
PVC: Shin-Etsu vinyl chloride compound wire EW-702B made by Shin-Etsu Polymer Co., Ltd.
PE: Ultdex 4030 made by MITUII PETROCHEMICAL INDUSTRIES, LTD.
PP: Grand Polypro J101 made by Grand Polymer Co., Ltd.
Nylon: Amiran Toray Nylon Resin CM1021TM made by Toray Industries, Ltd.
Polyester Elastomer: P-208B made by Toyobo Co., Ltd.
Polyester: Daiyanite KR-461S made by Mitsubishi Rayon Co., Ltd.

TABLE 12

Test Example 1

| Weight Filler | Ex. | (1) Before Broken | (2) Cushion structure | (3) Weight of filler (1)–(2) | (4) Pulverized Powder | (4)/(3) wt % |
|---|---|---|---|---|---|---|
| Y | 1 | 5.04 | 1.14 | 3.90 | 1.29 | 33.2 |
| Z | 1 | 8.82 | 1.14 | 7.68 | 2.29 | 30 |
| A | 1 | 12.6 | 1.14 | 11.46 | 3.2 | 28 |
| | 2 | 16.9 | 7.7 | 9.2 | 1.85 | 20.1 |
| | 3 | 15.8 | 5.4 | 10.4 | 2.04 | 19.6 |
| Comp. EX. | 1 | 13.5 | — | 13.5 | 1.0 | 9.0 |
| Comp. EX. | 2 | 12.6 | 1.14 | 11.46 | 1.95 | 17.0 |
| Comp. EX. | 3 | 12.7 | 1.14 | 11.56 | 1.64 | 14.2 |
| B | 1 | 16.3 | 1.14 | 15.16 | 3.3 | 22.0 |
| | 2 | 20.3 | 7.7 | 12.6 | 2.36 | 18.9 |
| | 3 | 19.5 | 5.4 | 14.1 | 2.64 | 18.7 |
| Comp. EX. | 1 | 18.1 | — | 18.1 | 1.2 | 8.1 |
| Comp. EX. | 2 | 16.4 | 1.14 | 15.26 | 2.3 | 15.1 |
| Comp. EX. | 3 | 16.4 | 1.14 | 15.26 | 1.69 | 11.1 |
| C | 1 | 20.54 | 1.14 | 19.40 | 3.4 | 18.0 |
| | 2 | 23.1 | 7.7 | 15.4 | 2.48 | 16.1 |
| | 3 | 22.7 | 5.4 | 17.3 | 2.72 | 15.7 |
| | 4 | 20.4 | 1.7 | 18.7 | 2.67 | 14.3 |
| Comp. EX. | 1 | 22.0 | — | 22.0 | 1.4 | 7.4 |
| Comp. EX. | 2 | 20.6 | 1.14 | 18.07 | 2.17 | 12.0 |
| Comp. EX. | 3 | 20.7 | 1.14 | 19.56 | 1.76 | 9.0 |
| D | 1 | 22.93 | 1.14 | 21.79 | 3.66 | 16.8 |
| E | 1 | 26.46 | 1.14 | 25.32 | 3.82 | 15.1 |

Experiment 2

Use was made of Polyester Elastomer P-208B made by Toyobo Co., Ltd. with wire diameters of φ3, φ1, φ0.5, φ0.1, and φ0.05.

Experiment 3

No cushion structure was not used, and the wire diameter was φ0.05.

Experiment 4

A wire of φ0.1 mm in diameter in Experiment 2 was knitted together into a fabric. Such fabrics were positioned at an interval of 2 mm in a cushion structure.

TABLE 13

Results of Experiments

| Resin | Wire Diameter | Penetration | Breaking area (Diameter of an inscribed circle) |
|---|---|---|---|
| PVC | φ0.5 | not found | φ123 mm |
| PE | φ0.5 | not found | φ142 mm |
| PP | φ0.5 | not found | φ151 mm |
| Nylon | φ0.5 | not found | φ172 mm |
| Polyester elastomer | φ0.5 | not found | φ170 mm |
| Polyester | φ0.5 | not found | φ184 mm |
| Polyester elastomer | φ3 | not found | φ163 mm |
| Polyester elastomer | φ1 | not found | φ165 mm |
| Polyester elastomer | φ0.5 | not found | φ170 mm |
| Polyester elastomer | φ0.1 | found | φ105 mm |
| Polyester elastomer | φ0.05 | found | φ90 mm |
| Not used | | found | φ6 hole and φ12 cracking |
| Polyester elastomer | φ0.1 2 mm spacing | not found | φ142 mm |
| Polyester elastomer | φ0.05 2 mm spacing | not found | φ105 mm |

A 300 kg weight could not go through PVC and polyester elastomer, and so other resins, too. were thought of as being sufficiently available.

At a wire diameter of φ3 to φ0.1, the weight could not go through the test piece.

At a bulk specific gravity of 0.003 or greater, the effect on shock absorption was found. The upper limit to bulk specific gravity was 0.3 for the vinyl chloride in Example 2. At greater than 0.3, sufficient incorporation of concrete is impossible.

Regarding a comparison between the whole size of the shock absorber and the size of the cushion structure, it is found from the results of testing that the shock absorber can break into large lumps with no cushion structure, and the distance between the outside of the shock absorber and the outside of the cushion structure inside should preferably be 5 cm or shorter.

Furthermore, examination was made of the following examples.

EXAMPLE 4

Polypropylene strips were stacked one upon another while they were in an as-curled state, and integrated together by fusion of points of contact of strips into a cushion structure.

Hechimaron (material for underdrainage and infiltration gallery) mat type 35BF made by Shinko Nylon Co., Ltd. was used. Four (4) such mats, each of 300×60×300 mm, were stacked one upon another in a thickness direction, and placed in a mold.

The stack was embedded and hardened in concrete under conditions A, B, and C.

TABLE 14

| Filler | Bottoming | State of Bottom (Cushion structure-free portion) |
|---|---|---|
| A | not found | no change |
| B | not found | no change |
| C | not found | no change |

TABLE 15

| Weight | (1) Before breaking | (2) Cushion structure | (3) Filler (1)–(2) | (4) Pulverized powder | (4)/(3) % |
|---|---|---|---|---|---|
| Filler A | 13.32 | 2.00 | 11.32 | 3.31 | 29.2 |
| Filler B | 16.95 | 2.00 | 14.94 | 3.48 | 23.3 |
| Filler C | 21.11 | 2.00 | 19.11 | 3.67 | 19.2 |

Regarding a comparison between the whole size of the shock absorber and he size of the cushion material, it is found from the results of resting that the shock absorber cannot disperse energy and so breaks into large lumps in the absence of any cushion structure.

EXAMPLE 5

Bless Air made by Toyobo Co., Ltd.

Three bless airs, each of 300 mm×300 mm×80 mm

A filler was provided on a 40 mm bottom opposing to an impact surface, and a cushion structure was exposed on a 50 mm impact surface.

The cushion structure was embedded and hardened in the filler under conditions A, B, and C.

TABLE 16

| Filler | Bottoming | State of Bottom Cushion structure-free portion |
|---|---|---|
| A | not found | no change |
| B | not found | no change |
| C | not found | no change |

TABLE 17

| Weight | (1) Before breaking | (2) Cushion structure | (3) Filler (1)–(2) | (4) Pulverized powder | (4)/(3) % |
|---|---|---|---|---|---|
| Filler A | 10.14 | 1.14 | 9.00 | 2.44 | 27.1 |
| Filler B | 13.21 | 1.14 | 12.07 | 2.52 | 20.9 |
| Filler C | 16.43 | 1.14 | 15.29 | 2.63 | 17.2 |

The effect on shock absorption is sufficient without doing more damage than required to the shock-receiving side, and is effective depending on purpose.

Example for Filler Preparation

Table 18 shows a preparation example of the filler used with the shock absorber according to the invention.

In the example shown in Table 1, the filler is composed only of the binder with water and a foaming agent added thereto. In the instant example, the filler comprises a binder, and contains one aggregate sand in an amount that is 2.5 times as large as the binder and another aggregate calcium carbonate (stone dust) in an amount that is 1.5 times as large as the binder, so that the strength of the binder can be reduced. By the addition of calcium carbonate, it is possible to improve the resistance of the binder to separating into individual materials as already mentioned, thereby bettering the shape retention of the filler after hardening.

TABLE 18

Filler Preparation Example (in kg/m$^3$)

| Strength | Binder | Calcium Carbonate | Sand | Water | Foaming agent | Diluting Water | Amount of air (%) |
|---|---|---|---|---|---|---|---|
| 2 kg·f/cm$^2$ | 100 | 150 | 250 | 226 | 0.94 | 22.56 | 56.4 |
| 4 kg·f/cm$^2$ | 125 | 125 | 250 | 226 | 0.95 | 22.70 | 56.8 |

* Basic physical properties Green specific gravity: 0.75 ± 0.1 t/m$^2$ Flow Value: 200 ± 20 mm
* Strength measured as compression strength 7, 14, 28 and 91 days after molding, using φ 10 × 20 cm test piece
* Surfactant was used as foaming agent.

The filler having the composition shown in Table 18 has a mass of 60 to 120 kg/m$^3$ that is much lower than 200 to 400 kg/m$^3$, a mass of concrete used for general structures such as buildings. This filler contains air in an amount of 40% or greater, and has a breaking strength of 2 kgf/cm$^2$ or 4 kgf/cm$^2$; that is, it can break under a relatively low pressure. Upon receipt of an impact exceeding the breaking strength, inter-aggregate bonds such as inter-sand bonds can break, so that the filler can break in the form of particles wherein the binder and calcium carbonate deposit around the aggregate.

It is here to be noted that the aforesaid flow value (of 150 or greater) is the value required for the filler to filling tightly the voids formed in the cushion structure.

Collision Test

Then, moving barrier testing was conducted on the shock absorber using the filler prepared with the composition shown in Table 18. One method for this collision testing is shown in FIG. 1.

Figure 1:
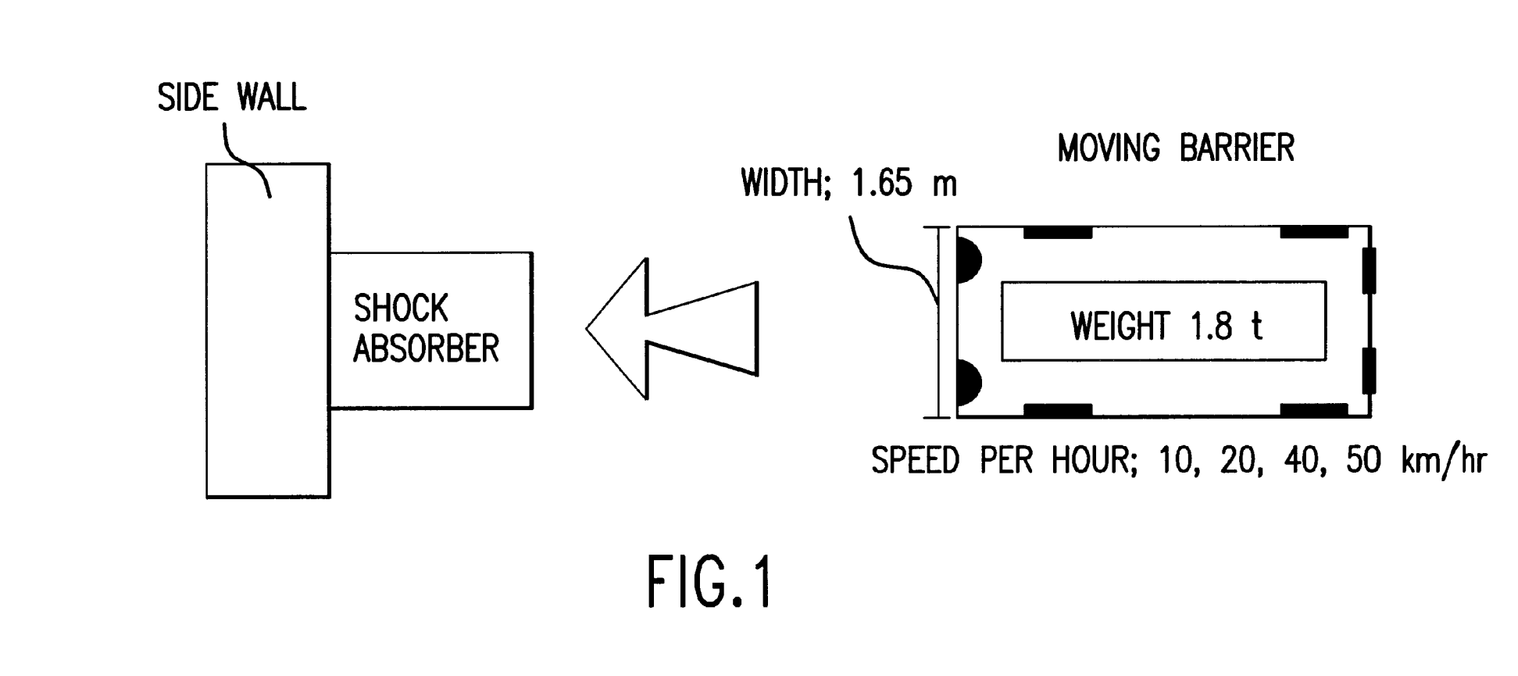
FIG. 1 illustrative of how to conduct collision testing.

As shown in FIG. 1, a shock absorber was positioned while its back side came into contact with a side wall. A collision testing was then conducted on this shock absorber while a 1.8 ton weight was placed on a moving barrier of 1.65 m in width. The reason that a 1.8 ton weight was placed on the moving barrier is that the weight of an accident-prone automobile of the class having an engine displacement of 2,000 cc or greater is about 1.8 tons. In this example, whether or not the shock absorber could absorb shocks upon collision of an automobile of this class with the moving barrier was tested.

Where each test piece was positioned, and the collision speed of the moving barrier are shown in Table 19.

By the term "moving barrier" used herein is intended an experimental vehicle that as a steel structure, and is of rigidity high-enough to be little susceptible to deformation or other defect even upon collision with something.

TABLE 19

Collision Testing Conditions for Shock Absorber

| Test No. | Sample | Speed | Test No. | Sample | Speed |
|---|---|---|---|---|---|
| 1 | 2-C | 20 | 9 | 2-A | 50 |
| 2 | 2-C | 40 | 10 | 2-B + 2-C | 50 |
| 3 | 4-C | 40 | 11 | 4-A + 4-B | 50 |
| 4 | 4-C | 50 | 12 | 4-C + 4-C | 50 |
| 5 | 4-B | 50 | 13 | 2-C + 2-C | 10 |
| 6 | 4-A | 50 | 14 | 2-C + 2-C | 10 |
| 7 | 2-C | 50 | 15 | Cushion alone | 20 |
| 8 | 2-B | 50 | 16 | 2-D | 50 |

In Table 19, the reference numerals in the sample-representing, symbols stand for the type of the filler used. For instance, reference numeral 2 stands for a sample containing 2 kgf/cm$^2$ of filler in Table 18, and 4 a sample containing 4 kgf/cm$^2$ of filler Table 18.

In Table 19, the alphabet attached to the end of sample No. represents the type of the cushion structure used. Set out below are the cushion structures used herein.

Cushion Structure A (With low density)
  Strip Diameter: φ1.0 mm
  Weight: 36 kg
  Size: 1,000 (thickness)×1,000 (width)×900 (height) mm
  (Thickness: direction perpendicular to the side wall,
  Width: direction parallel with the side wall)
Cushion Structure B (With Medium Density)
  Strip Diameter: φ1.0 mm
  Weight: 45 kg
  Size: 1,000 (thickness)×1,000 (width)×900 (height) mm
Cushion Structure C (With High Density)
  Strip Diameter: φ1.0 mm
  Weight: 63 kg
  Size: 1,000 (thickness)×1,000 (width)×900 (height) mm
Cushion Structure D (With Very Low Density)
  Strip Diameter: φ1.0 mm
  Weight: 27 kg
  Size: 1,000 (thickness)×1,000 (width)×900 (height) mm It is here to be noted that the cushion structures in test Nos. 13 and 14 had a size of 300×1,000×1,000 mm.

Figure 2:
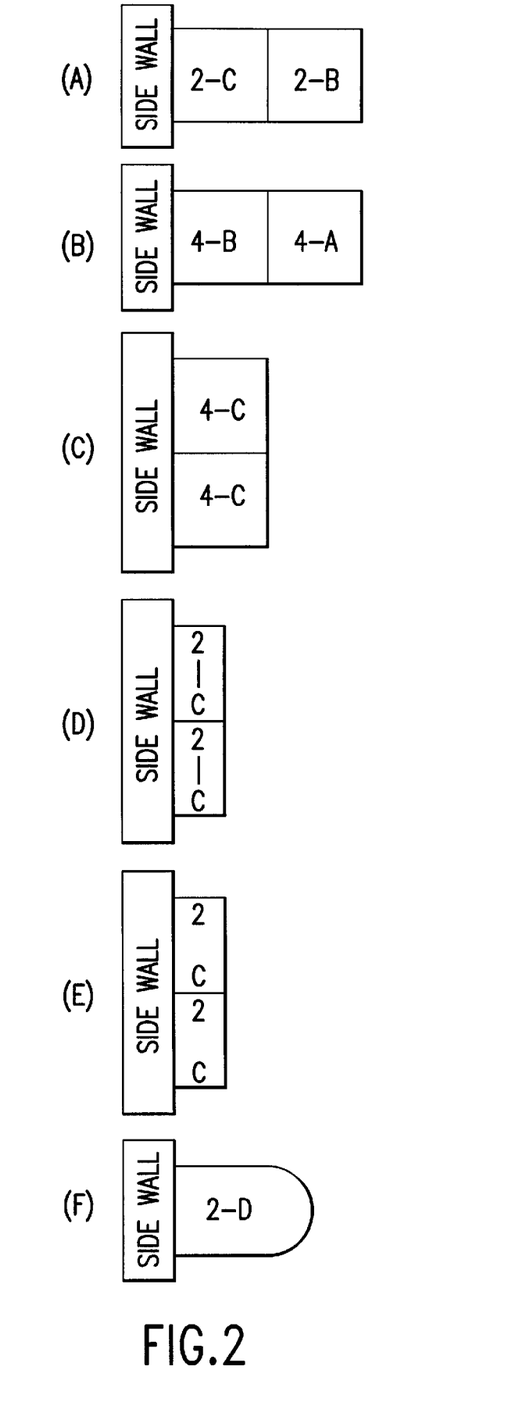
FIG. 2 is illustrative of where the shock absorber is positioned for collision testing.

In test Nos. 10 to 14 and 16, the shock absorbers were positioned as shown in FIG. 2.

Table 20 shows the maximum acceleration (G) of the moving barrier in each test run.

TABLE 20

Maximum Acceleration of Moving Barrier

| Test No. | Maximum Acceleration (G) |
|---|---|
| 1 | 15.1 |
| 2 | 21.7 |
| 3 | 34.7 |
| 4* | 35.5 |
| 5* | 36.1 |

TABLE 20-continued

Maximum Acceleration of Moving Barrier

| Test No. | Maximum Acceleration (G) |
| --- | --- |
| 6* | 36.0 |
| 7* | 26.9 |
| 8* | 26.8 |
| 9* | 20.8 |
| 10* | 24.8 |
| 11* | 38.6 |
| 12* | 69.2 |
| 13* | 12.7 |
| 14* | 25.0 |
| 15* | 4.6 |
| 16* | 16.3 |

*Collision Test at 50 km/h

In each test run, the shock absorber of the invention changes from a solid form to a particulate (sandy) form upon collision with the moving barrier, and so can absorb shocks in an acceptable manner upon collision with the moving barrier.

Of the fillers used, the filler having a compression strength of 2 kgf/cm$^2$ is excellent in shock absorption capabilities. The cushion structure, when used in combination with the filler having a compression strength of 2 kgf/cm$^2$, is improved in terms of shock absorption capabilities as the density becomes low. However, when the cushion structure is used in combination with the filler having a compression strength of 4 kgf/cm$^2$, no considerable change is found depending on its density.

The aforesaid results indicate that the greatest shock absorption capabilities are achievable in the case of test No. 16 where the filler having a compression strength of 2 kgf/cm$^2$ is used in combination with the cushion structure having a very low density and the shock absorber is positioned as shown in FIG. 2(F).

In the collision test run where the speed per hour of the moving barrier was 50 km/h, the maximum acceleration of the moving barrier was greater than 20 G except test No. 16. This is because the moving barrier is of rigidity high-enough to be little susceptible to deformation even upon collision with the shock absorber. In the invention, the shock absorber is designed for the purpose of acheiving gravitational acceleration of 20 G or less, preferably 15 G or less, and more preferably 12 G or less through the synergistic effect between shock absorption by the shock absorber and shock absorption by vehicle's deformation. With the shock absorbers in test Nos. 7 to 10, it may be possible to achieve gravitational acceleration of 20 G or less upon collision, even when the speed per hour of a colliding vehicle is 50 km/h. This is because upon collision of an actual car with the shock absorber, the car itself crashes to absorb shocks. In a collision test using an actual car, too, the shock absorber in test No. 16 may absorb shocks to 15 G or less, even when the speed per hour of the colliding car is 50 km/h.

Figure 3A:
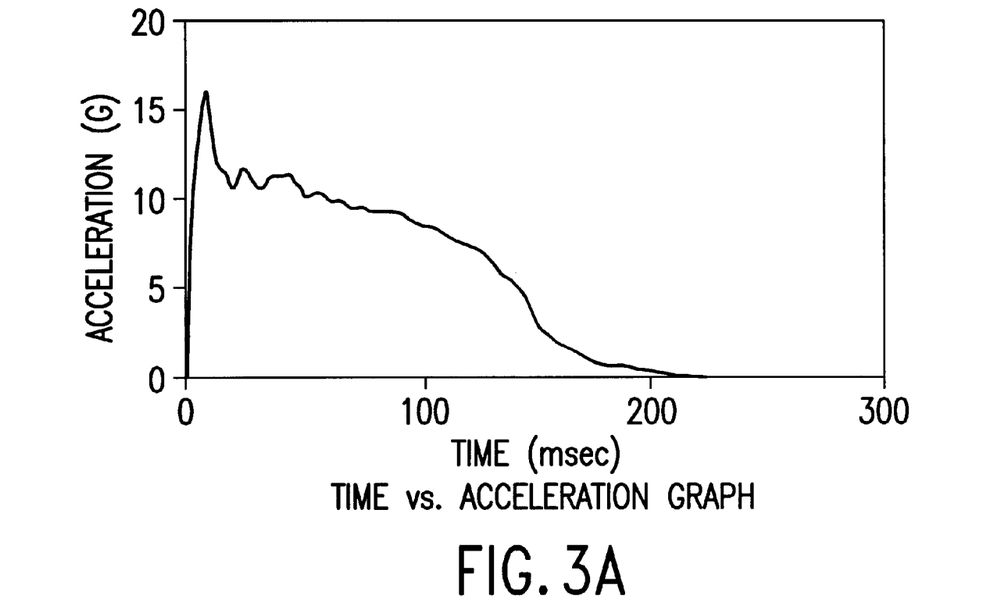
FIG. 3 shows the results of test No. 16 in Table 19, with (A) being a time vs. acceleration curve and (B) being a displacement vs. load curve.
Figure 3B:
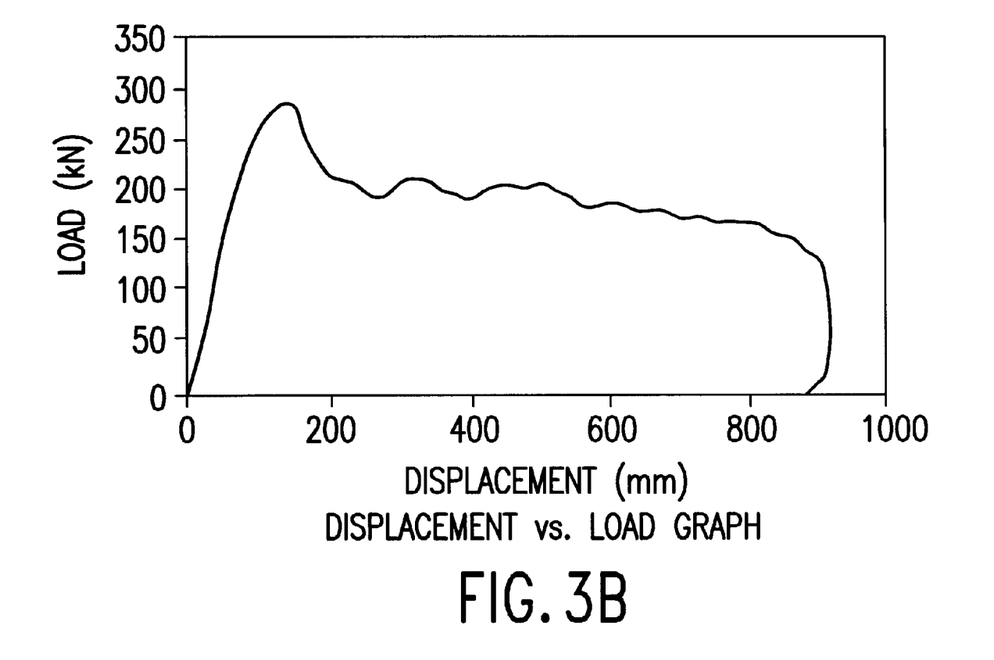
Figure 4A:
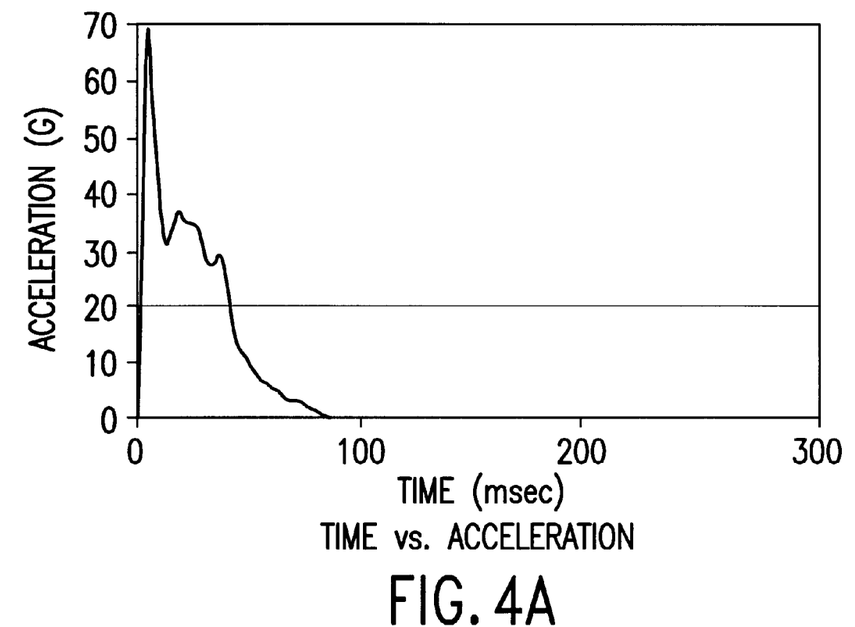
FIG. 4 shows the results of test No. 12 in Table 19, with (A) being a time vs. acceleration curve and (B) being a displacement vs. load curve.
Figure 4B:
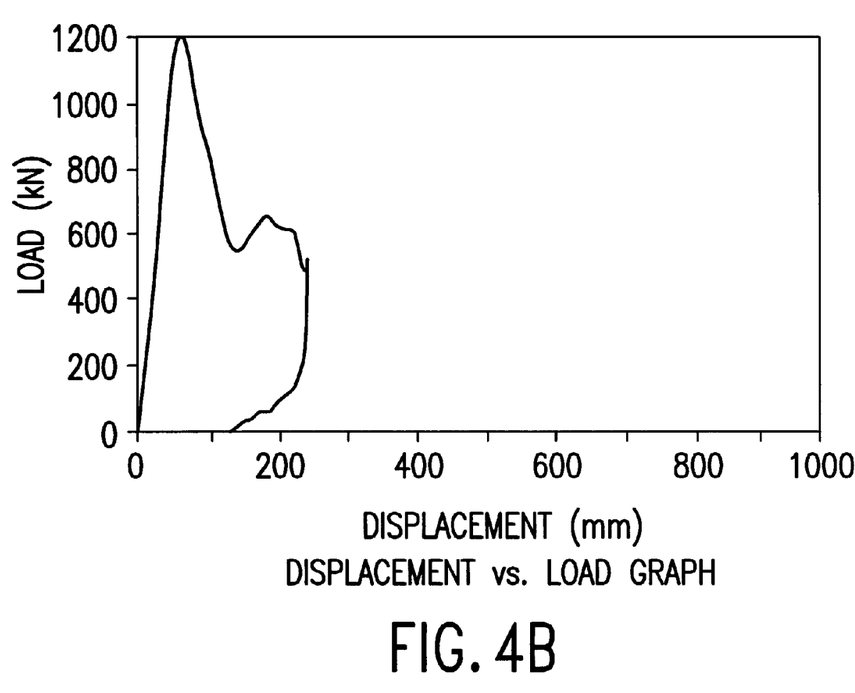

For the purpose of comparison, a time vs. acceleration curve (FIG. 3(A)) and a displacement vs. load curve (FIG. 3(B)) obtained from the results of test No. 16 showing the greatest shock absorption capabilities are attached hereto together with a time vs. acceleration curve (FIG. 4(A)) and a displacement vs. load curve (FIG. 4(B) obtained from the results of test No. 12 where no sufficient shock absorption capabilities were achieved.

As can be seen from FIG. 4(A), the time vs. acceleration curve for test No. 12 where no sufficient shock absorption capabilities were obtained goes down drastically, indicating that shocks upon collision can be absorbed within a relatively short time of about 80 msec. On the other hand, the time vs. acceleration curve for test No. 16 is gentler than that for test No. 12, indicating that the shocks upon collision can be absorbed over a relatively long time of 200 msec. or more, and so high shock absorption capabilities are achieved.

According to the displacement vs. load curve (FIG. 4(B)) for test No. 12, it is found that the displacement value goes back to about 120 mm once arriving at about 240 mm; this is referred to as "rebound". In the displacement vs. load curve (FIG. 3(B)), on the other hand, this "rebound" is hardly found, indicating that shocks can be absorbed in a suitable fashion.

Figure 5:
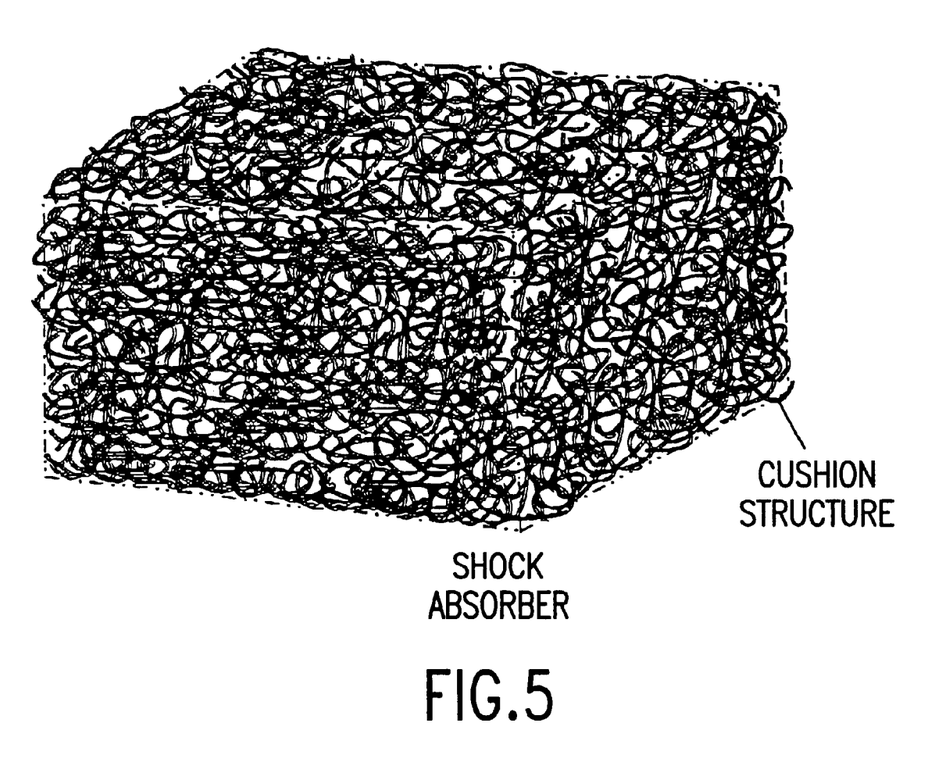
FIG. 5 shows a shock absorber according to an embodiment of the present invention.

According to the present invention as explained in the foregoing, it is possible to provide a shock absorber (see FIG. 5) which can have extremely improved shock absorption capabilities, can be easily formed or produced depending on purpose, and can accommodate well to a wide scope of applications, and a filler for the shock absorber. The shock absorber may be housed in a plastic container.

The shock absorber has so high shock absorption capabilities that gravitational acceleration (gravity applied on the floor of a vehicle in the back-and-forth direction) applied on the vehicle upon collision with the shock absorber can be brought down to 20 G or less, preferably 15 G or less, and more preferably 12 G or less. It is thus possible to reduce as much as possible fatalities and serious accidents leading to serious traumas. It is also possible to provide a filler suitable for use with such a shock absorber, which has a breaking strength enabling the filler to be appropriately broken upon receipt of a certain or larger shock to absorb the shock while it satisfying conditions regarding the necessary weight, flame retardance, weather resistance, endurance. etc.

Thus, the broadest claims that follow are not directed to a machine that is configuration a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation as to protect the heart of this invention, as a matter of law.

It will thus be seen that the objects set forth above, and those made apparent from the foregoing description, are efficiently attained. Also, since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described;

What is claimed is:

1. A shock absorber comprising a cushion structure of three-dimensional spring construction, a part of which is embedded and solidified in a foamed and hardened filler containing a hydratable, hydraulic binder, said cushion structure having a large void provided by a random curl or loop formed by extruding a thermoplastic resin in a molten state to form continuous strips and curling or looping said strips to bring adjacent strip sections into interlocking contact with each other.

2. A shock absorber according to claim 1, wherein said cushion structure has a bulk specific gravity of 0.003 to 0.3 g/cm$^3$.

3. A shock absorber according to claim 1, wherein said cushion structure has a strip diameter of 0.1 to 3 mm.

4. A shock absorber according to claim 1, which has a specific gravity of 0.2 to 1.3.

5. A shock absorber according to claim 1, which comprises a combination of some cushion structures having varying bulk specific gravity or strip diameters.

6. A shock absorber according to claim 1, wherein said cushion structure is formed by stacking a plurality of cushion structure members, each formed with a given thickness, parallel one upon another in a thickness direction.

7. A shock absorber according to claims 1, which is contained in a plastic container.

8. A method for producing a shock absorber, characterized by placing a cushion structure of three-dimensional spring construction in a mold, and pouring and aging a foaming filler containing a hydratable, hydraulic binder in said mold, said cushion structure having a large void provided by a random curl or loop formed by hot extruding a thermoplastic resin to form a continuous strip and curling or looping said strip in a molten state to bring adjacent strip sections into interlocking contact with each other.

9. A method for producing a shock absorber according to claim 8, wherein said mold is a plastic container which per se forms an outer face or wall of a shock absorber.

* * * * *